No. 771,899. PATENTED OCT. 11, 1904.
E. O. FEHR.
DUMP CAR ELEVATOR.
APPLICATION FILED NOV. 16, 1903.
NO MODEL. 2 SHEETS—SHEET 1.
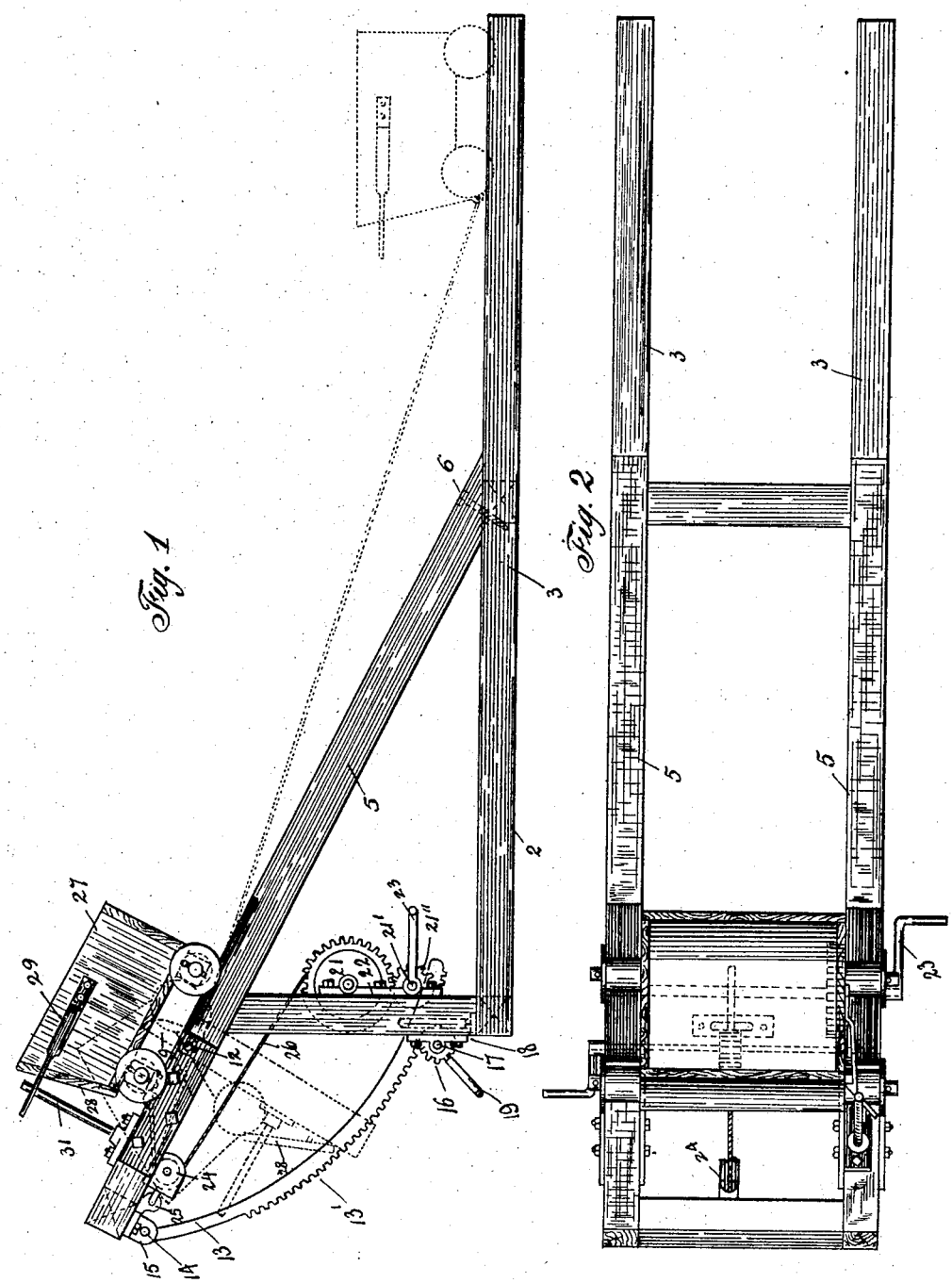
WITNESSES
E. A. Houghtaling
Paul Gerhardt
INVENTOR
Edgar O. Fehr
By Robt. Klotz
ATTORNEY No. 771,899. PATENTED OCT. 11, 1904.
E. O. FEHR.
DUMP CAR ELEVATOR.
APPLICATION FILED NOV. 16, 1903.
NO MODEL. 2 SHEETS—SHEET 2.
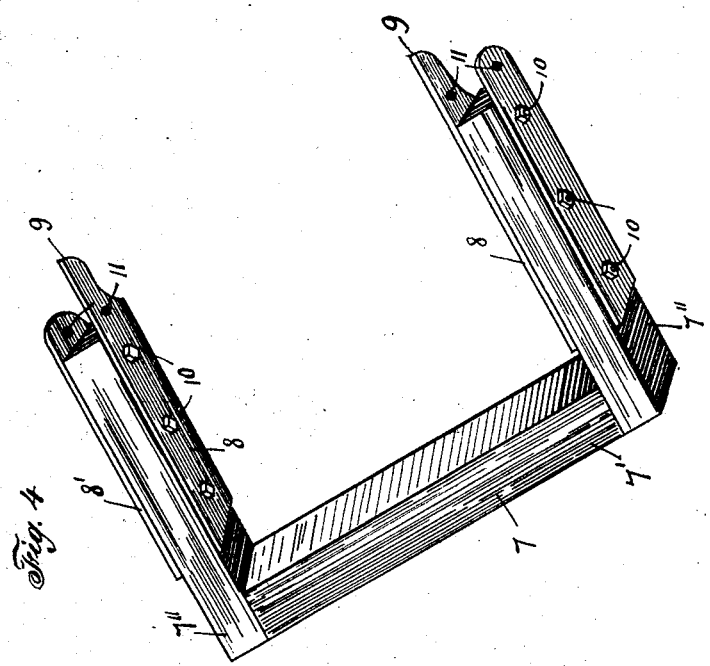
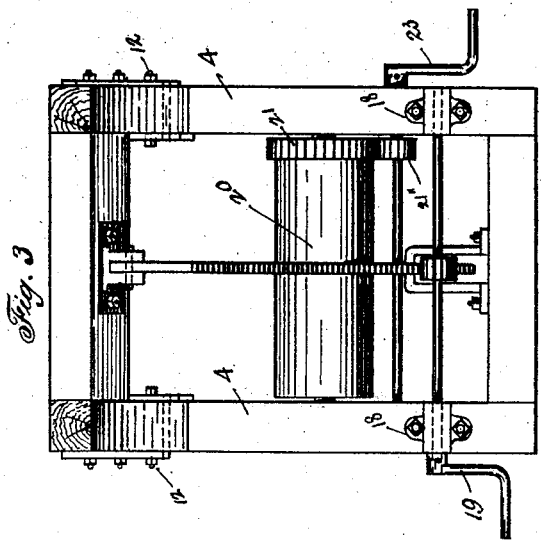
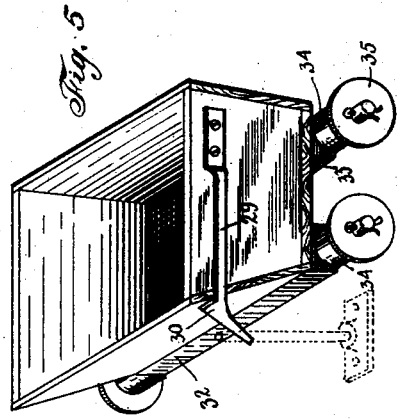
WITNESSES
INVENTOR
Edgar O. Fehr
By Robt. Klotz
ATTORNEY No. 771,899.

Patented October 11, 1904.

UNITED STATES PATENT OFFICE.

EDGAR ORLANDO FEHR, OF ORANGEVILLE, ILLINOIS.

DUMP-CAR ELEVATOR.

SPECIFICATION forming part of Letters Patent No. 771,899, dated October 11, 1904.

Application filed November 16, 1903. Serial No. 181,268. (No model.)

*To all whom it may concern:*

Be it known that I, EDGAR ORLANDO FEHR, a citizen of the United States, residing at Orangeville, in the county of Stephenson and State of Illinois, have invented certain new and useful Improvements in Dump-Car Elevators, of which the following is a specification.

This invention relates to dump-cars and means for elevating same, and has particular reference to apparatus for conveniently and economically tilting a section of track and a car or cart thereupon and returning the latter to normal position for reloading.

The object of the invention is to provide a simple construction adapted to be operated by hand and by a single person, and the particular object is to provide a car and inclined track or dump for same adapted for use on a farm in loading manure on spreader-wagons or "manure-spreaders," to the end of greatly economizing time and labor and keeping said spreaders in continuous action.

The invention consists, generally speaking, in a preferably portable inclined track having a pivotally-movable drop portion and a relatively fixed portion, means for actuating the former, and means for elevating a car thereto.

The invention further consists in a novel dump-car adapted to coöperate with said track.
The invention further consists in an inclined track, a pivotally-movable portion for same, and means upon the latter for supporting a car while being dumped.

The invention further consists in a dump-car provided with a drop-door, a catch or keeper therefor, and means upon said movable portion of track for automatically releasing said door; and the invention further consists in the novel details of construction and combination of parts hereinafter more fully described, illustrated in the drawings, and incorporated in the claims.

My invention will be more readily understood by reference to the accompanying drawings, forming a part of this specification, and in which—

Figure 1 is a view representing a side elevation of an apparatus embodying my invention. Fig. 2 is a top plan view. Fig. 3 is an end view. Fig. 4 is an enlarged detail view of the pivotally-movable portion of track or dump, and Fig. 5 is an enlarged view of a dump-car embodying my novel construction.

In the drawings, 2 represents a framework consisting of the horizontal timbers 3 3, the uprights 4 4, and the inclined timbers 5, resting upon the former and secured thereto by any suitable means, such as bolts or screws 6. The upper surface of the obtuse angle formed by the timbers 3 and 5 constitutes the track for the dump-car, which may be provided with rails, if desired, although as herein illustrated the timbers themselves form the rails and the wheels or trunnions of the car are adapted to travel upon the plain timbers.

At the upper end of the inclined timbers 5 and pivoted thereto is a track extension 7, consisting of three pieces of timber 7', 7'', and 7'', the latter being joined in any suitable manner at right angles to the ends of the former, as shown. The free ends of the pieces 7'' are each provided with a pair of hinge-plates 8 and 8', the latter being extended into projecting spurs or horns 9. Said plates are secured on opposite sides of each of the pieces 7'' by means of bolts 10, which preferably extend through plates and timbers and clamp the parts together. However, the details of their exact construction or mode of fastening are immaterial, as I do not wish to confine my invention to any specific details in carrying out the idea illustrated.

11 11 are concentric apertures through the plates or straps 8 8' for the pivot rod or rods or bolts 12, extending through similar apertures in the upper ends of the timbers 5, which enter between the plates or straps 8 8'.

The drop or movable portion of track 7 is held normally in alinement with the timbers or track portion 5 5, as well as tilted at any suitable angle thereto, by means of the supporting rack-bar 13, having a toothed portion 13'. Said bar is pivoted at 14 to a bracket 15, secured to the under side of timber 7'. A pinion 16 upon shaft 17, journaled in bearing-brackets 18, suitably secured to the upright, meshes with the teeth of the rack-bar and is rotated by means of a crank 19 upon one end of the shaft 17. Any suitable pawl-and-ratchet or other device (not shown) may be provided for preventing rotation of the shaft and pinion. A drum 20, provided with a gear 21 at one end, is journaled in brackets 22, one of which is plainly shown in Fig. 1, and said drum is also provided with a crank 23, by means of which it is rotated.

24 is a pulley or sheave hung upon an eye-casting 25, and the latter may be integral with the bracket 15. A rope or cable 26, wound partly upon the drum 20, passes thence over the sheave 24 to the front axle of the car 27. The body of the latter is preferably of plain rectangular form, except that the front 28 is inclined, and said front is also pivoted or hinged near the bottom of the car, the details of which are immaterial for the purpose of illustrating my invention, and therefore not shown. A spring-catch 29 is secured to one side of the car and is provided with a hook end 30, bent at an angle from the side of the car, and thus providing an incline adapted to engage an upright or bar 31, secured to the upper surface of the pivotally-movable portion of track 7 and be forced outward thereby to release the front or door 28. The dotted lines in Fig. 5 show the position of the bar with relation to the spring-catch, and same are also plainly shown in Fig. 1. The front and rear axles 32 and 33, respectively, carry trunnion-like wheels 34, having flanges 35 upon their outer faces which engage the outer vertical sides of the track. The crank 23 for the gear 21 is mounted upon the shaft 21', which carries a pinion 21'', meshing with the gear 21. Said pinion being of considerably less diameter than the drum-gear is capable of transmitting considerable power to the latter when the crank 23 is turned. The same result may also be accomplished by applying the crank direct to the drum and employing compound sheaves, if preferred. The dotted lines in Fig. 1 illustrate the lowered position of the movable track 7, as well as the lowered position of the drop-door 28, and one of the front wheels lowered and one of the rear wheels held against the projecting spur or horn 9.

As stated in the fore part of this specification, this invention is designed, primarily, to facilitate the loading of manure upon spreaders, the intention being that one man remain constantly at work loading the car while another man is unloading the spreader. The capacity of the car is therefore preferably made the same as that of the box of the spreader, and the operation of my invention is therefore as follows: The framework or track 2 is erected at or hauled to the manure pile or stack. The car 27 is then placed on the lower or level portion of track, as indicated by the dotted outlines of car in Fig. 1. The rope or cable 26 is then secured to the front axle of the car, passed over the sheave or pulley, and secured to the drum. The man doing the loading having filled the car proceeds to rotate the crank 23, which draws the car to the top of the track and onto the section 7 thereof. The drum is then locked against rotation by any suitable means. The loading man next manipulates the crank 19 to lower the track portion 7, and therewith the front end of the car, the latter having been moved just far enough to cause the spring-catch 29 to touch the upright bar 31. As the track-section 7 is tilted the rear axle of the car is brought against the horns or spurs 9, which are now projected upward above the stationary portion of track, and the slight additional movement of the car will force the bent portion of catch against the bar 31, pressing it outward to disengage the door 28, which then drops forward, dumping the contents in the spreader-box placed in a convenient position underneath to receive the contents of the car, which, as stated, is held against dropping off the upper end of the stationary track by the spurs or horns 9. The crank 19 is then rotated in the opposite direction and the car raised back to the position shown at the upper end of track in Fig. 1. The rotation of crank 23 is next reversed to permit the car to move down the track to its original position, and while the load dumped into the spreader is hauled out the loading man proceeds to fill up another car and elevate it, as previously described, by the time the empty spreader is unloaded. Of course the latter will be unloaded in less time when once on the field than it takes to load the car; but as the time consumed in driving to and from the field will be utilized by the loader to fill up his car the advantage in time thus gained will substantially offset the faster unloading when once on the field, and thus enable one man at work loading to keep the driver of the spreader constantly in action driving the spreader to and from and on the field.

It will thus be seen that with the aid of my invention one spreader may be caused to do the work of two where the spreaders must, as is now the case, be held at the source of supply during the loading by hand. In other words, two men and one spreader are enabled to do substantially the same amount of work as two men and two spreaders could formerly accomplish, to say nothing of the additional horse-power required by former methods.

It is obvious that my invention is equally as well adapted for loading grain upon wagons from bins or cribs, for loading earth from building excavations, for filling tenders of locomotives, and in innumerable other ways. It is further obvious that with slight adaptations my elevating mechanism may be used to hoist and dump whole wagon-loads of corn into cribs during husking time by hitching the rope or cable to the rear axle of an ordinary wagon and dumping the whole contents through the end-gates instead of shoveling it out. Where the elevation is considerable, a small gasolene-engine or the like may be employed to furnish the power.

The construction being simple, the whole can be quickly taken apart and stored like ordinary timbers when not in use, and, save for the special rack-bar required, the whole may be built and assembled by any ordinary mechanic or farmer.

It is obvious from the foregoing description of my invention that the spirit thereof admits of numerous modifications in its embodiment, and I therefore do not confine my invention to the specific construction herein shown and described.

Having thus described my invention, I claim as new and desire to secure by Letters Patent—

1. An inclined track having a pivotally-movable drop portion and connecting means underneath said portion for moving and supporting the latter with relation to the former.

2. An inclined track, a movable portion hinged thereto, a car movable along said track, means for tilting said movable portion and means upon the latter engaging the axle of said car when tilted and supporting the latter at an angle to said track.

3. The combination, with a car, of an inclined track having an angularly-movable portion and a supporting-framework, a hoisting device upon the latter for propelling said car along said track, a mechanism for tilting said movable portion with said car thereupon, and an extension of said movable portion projecting above said track when said portion is tilted and adapted to engage and hold the rear axle of said car whereby the latter may be held in a position at an angle to and partially below said inclined track.

In testimony whereof I have hereunto set my hand in the presence of two subscribing witnesses.

EDGAR ORLANDO FEHR.

Witnesses:
DAVID G. SMITH,
JOHN KERR MILLER.